US010029655B1

(12) United States Patent
Voelker et al.

(10) Patent No.: US 10,029,655 B1
(45) Date of Patent: Jul. 24, 2018

(54) WHEEL AND LUG NUT CLEANING DEVICE

(71) Applicants: Scott Voelker, Miami, FL (US); Jonathan Batchelor, Jr., Miami, FL (US)

(72) Inventors: Scott Voelker, Miami, FL (US); Jonathan Batchelor, Jr., Miami, FL (US)

(73) Assignee: Black Tie Brands, LLC, Miami, FL (US)

( * ) Notice: Subject to any disclaimer, the term of this patent is extended or adjusted under 35 U.S.C. 154(b) by 0 days.

(21) Appl. No.: 15/230,177

(22) Filed: Aug. 5, 2016

(51) Int. Cl.
  *B60S 3/04* (2006.01)
  *B08B 1/00* (2006.01)

(52) U.S. Cl.
  CPC .............. *B60S 3/042* (2013.01); *B08B 1/006* (2013.01); *B60S 3/041* (2013.01); *B60S 3/045* (2013.01)

(58) Field of Classification Search
  CPC ... A46B 2200/3046; A46B 3/16; A46B 5/002; B60S 3/045; B60S 3/042
  USPC .................................... 15/106, 160, 164, 176
  See application file for complete search history.

(56) References Cited

U.S. PATENT DOCUMENTS

| | | | |
|---|---|---|---|
| 3,693,128 A * | 9/1972 | Jacobs, Jr. ............. | H01H 85/47 337/166 |
| 4,117,566 A | 10/1978 | Ward | |
| 5,123,763 A * | 6/1992 | Simmons ................ | A47L 25/00 15/104.04 |
| 5,806,128 A | 9/1998 | Love | |
| 6,473,930 B1 * | 11/2002 | Ortega .................... | A47L 17/00 15/118 |
| 7,356,867 B1 | 4/2008 | Beiermann | |
| 8,365,338 B1 * | 2/2013 | Figaro .................. | A46B 5/0091 15/160 |
| D693,128 S | 11/2013 | Williams et al. | |
| 9,283,595 B1 * | 3/2016 | Cooper ................... | B08B 1/002 |
| 2004/0040113 A1 * | 3/2004 | Buzard ................... | B60S 3/042 15/244.1 |
| 2008/0104779 A1 * | 5/2008 | Schouten ................ | A46B 3/16 15/21.1 |

* cited by examiner

*Primary Examiner* — Michael Jennings
(74) *Attorney, Agent, or Firm* — Mark C. Johnson; Johnson |Dalal

(57) ABSTRACT

A wheel and lug nut cleaning device providing a single tool for cleaning behind and between spokes of a wheel rim, the lug nuts, and rim cavities around the lug nuts by including a static spine having an exterior end, an angled front portion proximal thereto, an interior end, and a rear portion. A shape-retaining non-abrasive core encircles most of the spine. A sheath, removably encompassing and conforming to the core, has a tapered forward end, a rearward end, a central opening in the rearward end, and semi-obround microfiber flanges extended from the core. A lug nut and rim cavity-cleaning body, removably disposed on the interior end, has a substantially disc-shaped central base with an attachment end engageable to the central opening and flexible cleaning flanges radially disposed thereon and a cover removably disposed thereon, including a central ring and extensions radially disposed therefrom to cover the cleaning flanges.

10 Claims, 5 Drawing Sheets

US 10,029,655 B1

WHEEL AND LUG NUT CLEANING DEVICE

BACKGROUND OF THE INVENTION

Various types of vehicle wheel cleaning tools and vehicle lug nut cleaning tools are known in the prior art. Many of such known tools clean only the wheel or the lug nut, thereby requiring more than one device to clean both. In addition, such tools include an elongated handle, which does not permit sufficient force to vigorously and thoroughly clean the wheel and lug nuts. Further, some of the wheel and lug nut cleaning tools are motorized with a motor that does not have enough power for thorough cleaning, requires regular replacement of batteries, or requires an extension cord to plug the tools into an electric power source. Even still, several of the known wheel and lug nut cleaning tools do not provide a brush that is removable or removable and washable. However, what is needed, and what the present wheel and lug nut cleaning device provides, is a single wheel and lug nut cleaning device to clean an outer side of a wheel rim and an inner wheel rim behind and between the wheel spokes, where road grime and dirty brake dust tends to collect, as well as each lug nut itself and any and all rim cavities around the lug nuts, where road grime and brake dust additionally tends to collect. The instant device eliminates exposed metal parts in order to prevent scratching of and damage to the rim surface paint and the clear coat over the vehicle's paint in contrast to known wheel cleaning devices which have metal in a handle thereof to hold the bristles in place which, in turn, can rub against, scratch, and otherwise damage the rim and the paint on the vehicle. The present device further accommodates the cleaning of wheel rims in a wide range of sizes thereby eliminating the need for different tools for cleaning different cars. The shape of the spine is provided to reduce hand, wrist, and arm fatigue while cleaning the wheel rims and lug nuts on a vehicle. The device is formed of anti-microbial materials to reduce the odor and bacterial growth after getting wet when compared to similar known devices.

FIELD OF THE INVENTION

The present invention relates to vehicle wheel and lug nut cleaning devices, and more particularly, to an integrated wheel and lug nut cleaning device

SUMMARY OF THE INVENTION

The general purpose of the present wheel and lug nut cleaning device, described subsequently in greater detail, is to provide a wheel and lug nut cleaning device which has many novel features that result in a wheel and lug nut cleaning device which is not anticipated, rendered obvious, suggested, or even implied by prior art, either alone or in combination thereof.

To accomplish this, the present wheel and lug nut cleaning device provides a single tool for cleaning an outer side of a wheel rim and an inner wheel rim behind and between the wheel spokes, the lug nuts, and any and all rim cavities around the lug nut, where road grime and dirty brake dust tends to collect. The instant device includes a static central spine having an exterior end, an interior end, a receiver aperture disposed within the interior end, a front portion proximal the exterior end, and a rear portion continuously disposed between the front portion and the interior end. The front portion is disposed at an angle in a range of 10 degrees to 45 degrees relative the rear portion. A shape-retaining non-abrasive core encircles the exterior end, the front portion and the rear portion of the spine. The core is impervious to petroleum and is non-water absorbent as well as being non-biodegradable. A sheath removably encompasses and substantially conforms to the core. The sheath has a gradually tapered wheel spoke and wheel rim-cleaning forward end which diminishes in diameter toward a tip thereof, a rearward end, a central opening in the rearward end, and a plurality of spaced-apart semi-obround microfiber flanges continuously extended outwardly from the core away from spine from the tip to proximal the rearward end. A lug nut and rim cavity-cleaning body, removably disposed on the interior end of the spine, has a substantially disc-shaped central base which, in turn, has a proximal attachment end engageable to the receiver aperture disposed within the interior end and a plurality of spaced apart substantially parallelepiped flexible cleaning flanges radially disposed thereon. A gap is disposed between each of the cleaning flanges. A cover, removably disposed on the lug nut and rim cavity-cleaning body, includes a central ring and plurality of extensions radially disposed on the central ring, which are configured to engage and conform to the cleaning flanges. The core is formed of or has properties similar to dense viscoelastic foam having a weight per cubic foot, a density in a range per cubic foot, an indentation force deflection, a resilience, and a hardness measured by pressure applied to the foam in order to accommodate fusion with the spine along with non-abrasive thorough cleaning of the rim, rim cavities, and lug nut surfaces. The spine can be cylindrical or flat. Thus has been broadly outlined the more important features of the present wheel and lug nut cleaning device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
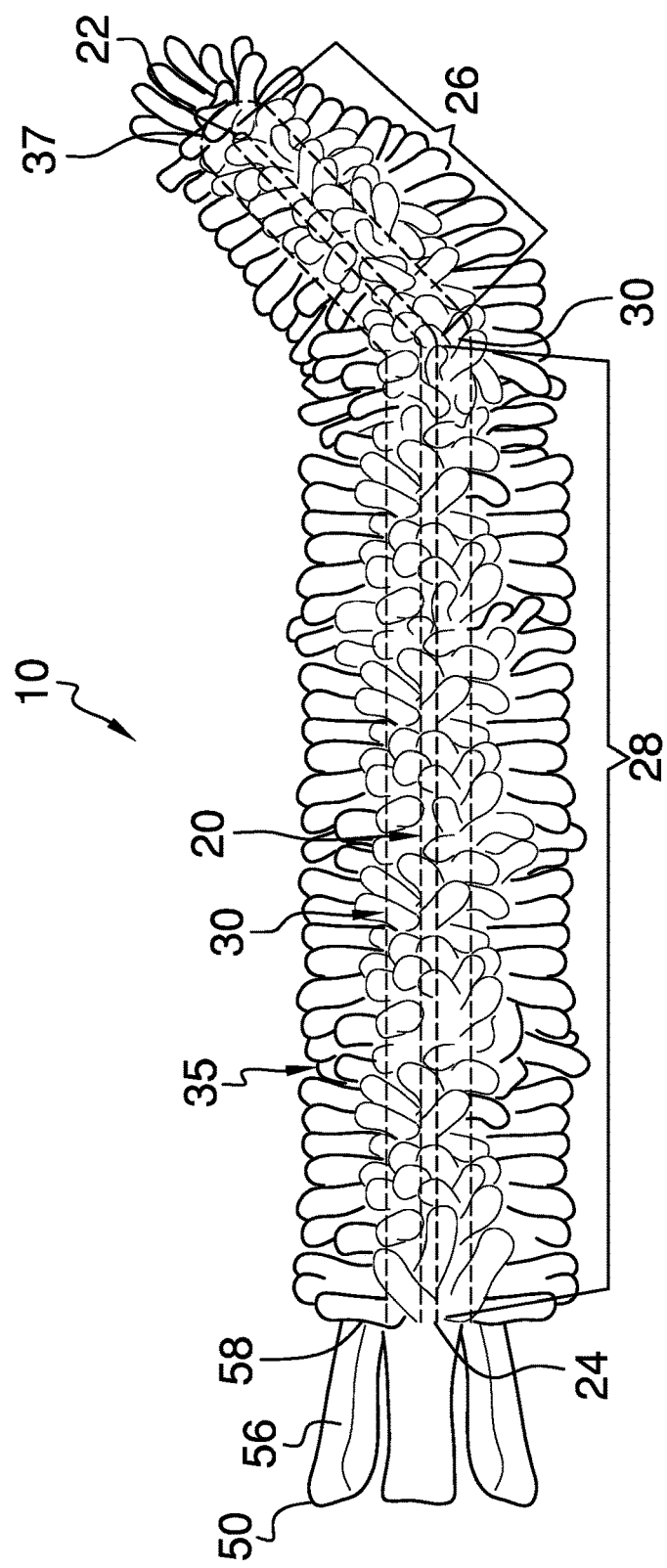
FIG. 1 is a side elevation view.
Figure 2:
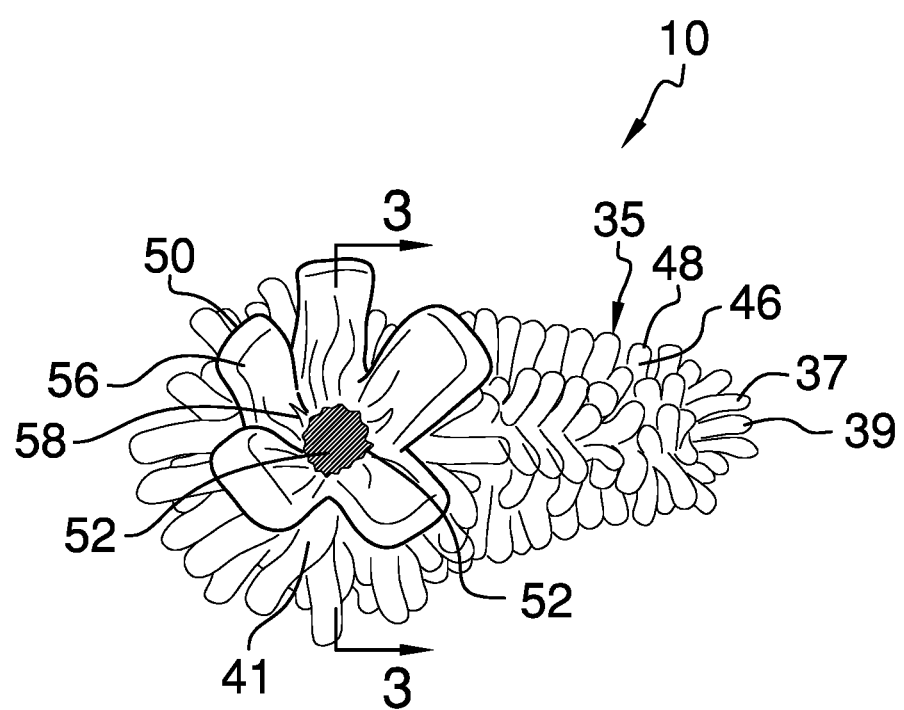
FIG. 2 is a bottom plan view.
Figure 3:
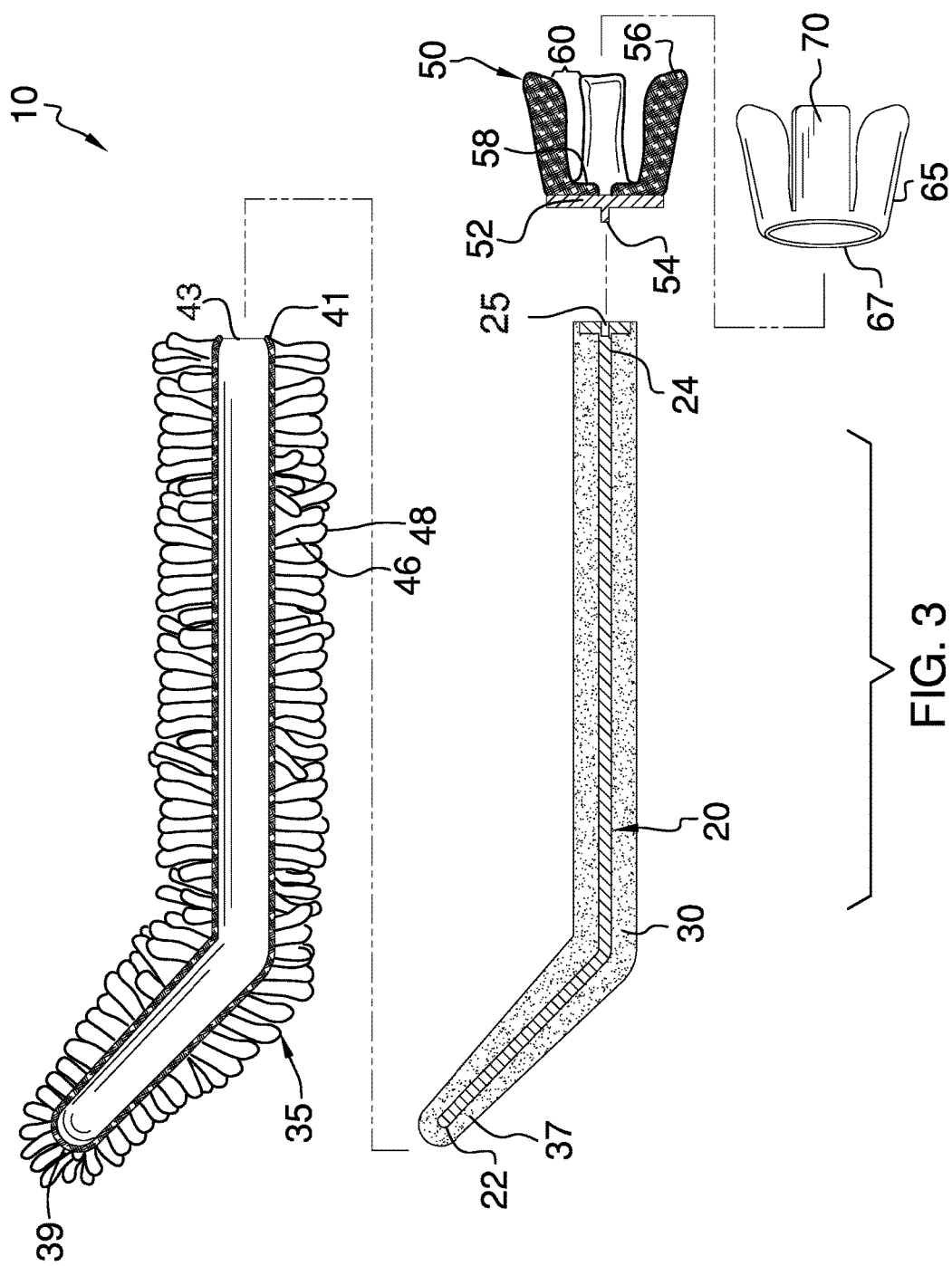
FIG. 3 is a cross-sectional view taken along line 3-3 of FIG. 2 with removable cover for a lug nut and rim cavity cleaning body exploded therefrom.
Figure 4:
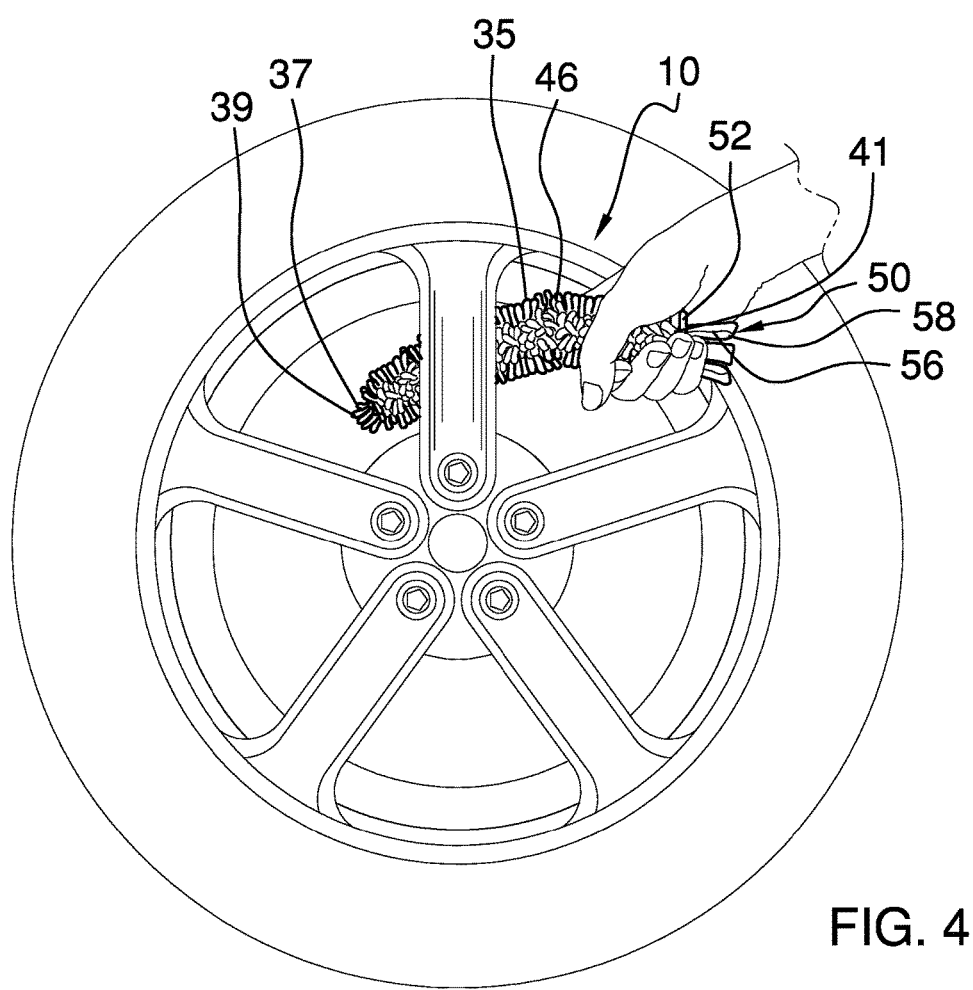
FIG. 4 is an in-use view illustrating use for cleaning a wheel spoke.
Figure 5:
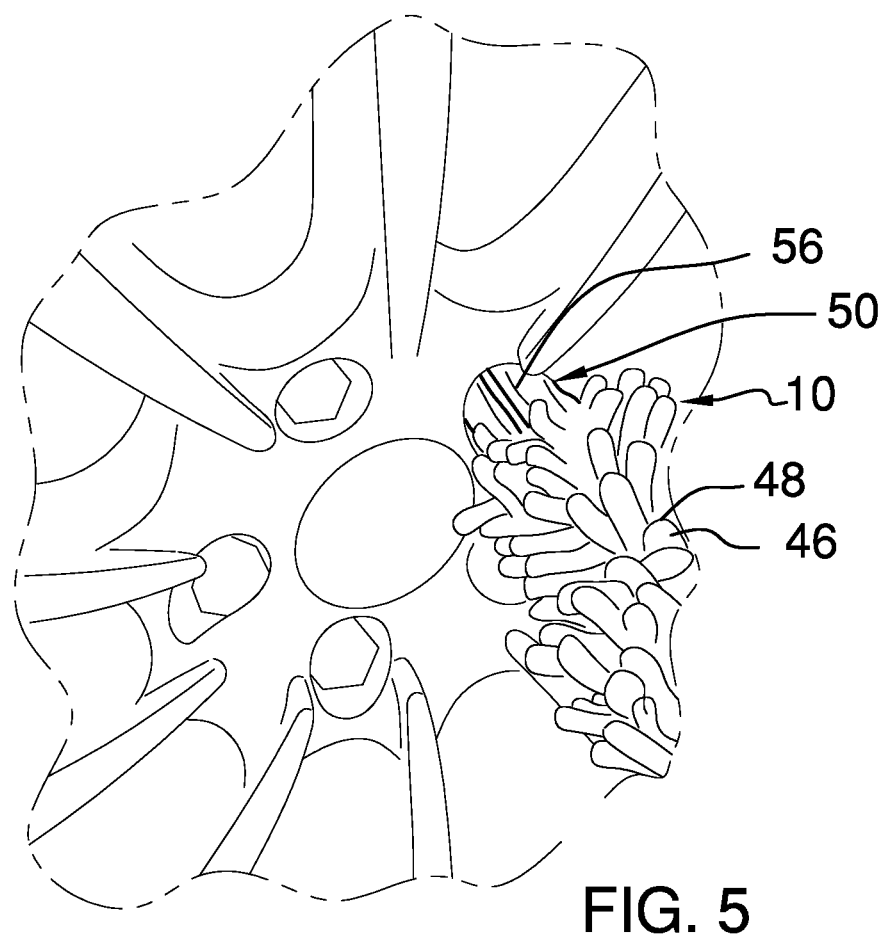
FIG. 5 is an in-use view illustrating use for cleaning a lug nut.

With reference now to the drawings, and in particular FIGS. 1 through 5 thereof, an example of the instant wheel and lug nut cleaning device employing the principles and concepts of the present wheel and lug nut cleaning device and generally designated by the reference number 10 will be described.

Referring to FIGS. 1 through 5, the present wheel and lug nut cleaning device 10 is illustrated. The wheel and lug nut cleaning device 10 includes a static central spine 20. The spine 20 has an exterior end 22, an interior end 24, a receiver aperture 25 disposed within the interior end 24, a front portion 26 proximal the exterior end 22, and a rear portion 28 continuously disposed between the front portion 26 and the interior end 24. The rear portion 28 is disposed in a single plane. The front portion 26 being disposed at an angle in a range of 10 degrees to 45 degrees relative the rear portion 28. The spine 20 is formed of a material selected from either a rust-resistant metal substance or a plastic-containing material.

A shape-retaining non-abrasive core 30 encircles the exterior end, the front portion and the rear portion of the spine. The core 30 is impervious to petroleum and is non-water absorbent as well as being non-biodegradable.

A sheath 35 removably encompasses and substantially conforms to the core 30. The sheath 35 has a gradually tapered wheel spoke and wheel rim-cleaning forward end 37 which diminishes in diameter toward a tip 39 thereof, a rearward end 41, a central opening 43 in the rearward end 41, and a plurality of spaced-apart semi-obround microfiber flanges 46. The microfiber flanges 46 continuously extend outwardly from the core 30 away from spine 20 from the tip 39 to proximal the rearward end 37. Each of the microfiber flanges 46 has a rounded external end 48. The microfiber flanges 46 are formed of chenille microfiber A lug nut and rim cavity-cleaning body 50 is removably disposed on the interior end 24 of the spine 20. The lug nut and rim cavity-cleaning body 50 has a substantially disc-shaped central base 52, which has a proximal attachment end 54 engageable to the receiver aperture 25 disposed within the interior end 24. The lug nut and rim cavity-cleaning body 50 also includes a plurality of spaced apart substantially parallelepiped flexible cleaning flanges 56 radially disposed on the central base 52. A gap 60 is disposed between each of the cleaning flanges 56. Each of the cleaning flanges 56 has an internal side 58 attached to the central base 52.

A cover 65 is removably disposed on the lug nut and rim cavity-cleaning body 50. The cover 65 includes a central ring 67 and plurality of extensions 70 radially disposed on the central ring 67. The extensions 70 are configured to engage and conform to the cleaning flanges 56.

The core 30 is formed of or has properties similar to dense viscoelastic foam having a weight per cubic foot, a density in a range per cubic foot, an indentation force deflection, a resilience, and a hardness measured by pressure applied to the foam in order to accommodate fusion with the spine along with non-abrasive thorough cleaning of the rim, rim cavities, and lug nut surfaces.

What is claimed is:

1. A wheel and lug nut cleaning device comprising:
   a static central spine having an exterior end, an interior end, a receiver aperture disposed within the interior end, a front portion proximal the exterior end, and a rear portion continuously disposed between the front portion and the interior end, the rear portion being disposed in a single plane, the front portion being disposed at an angle relative the rear portion;
   a shape-retaining non-abrasive core encircling the exterior end, the front portion and the rear portion of the spine;
   a sheath removably encompassing and substantially conforming to the core, the sheath having a gradually tapered wheel spoke and wheel rim-cleaning forward end diminishing in diameter toward a tip thereof, a rearward end, a central opening in the rearward end, and a plurality of spaced-apart semi-obround microfiber flanges continuously extending outwardly from the core away from spine from the tip to proximal the rearward end, each of the microfiber flanges having a rounded external end;
   a lug nut and rim cavity-cleaning body removably disposed on the interior end of the spine, the lug nut and rim cavity-cleaning body having a substantially disc-shaped central base having a proximal attachment end engageable to the receiver aperture disposed within the interior end and further having a plurality of spaced apart substantially parallelepiped flexible cleaning flanges radially disposed on the central base and a gap disposed between each of the cleaning flanges, each of the cleaning flanges having an internal side attached to the central base.

2. The wheel and lug nut cleaning device of claim 1 wherein the angle of the front portion relative the rear portion is in a range of 10 degrees to 45 degrees.

3. The wheel and lug nut cleaning device of claim 1 comprising:
   a cover removably disposed on the lug nut and rim cavity-cleaning body, wherein the cover includes a central ring and plurality of extensions radially disposed on the central ring, wherein the extensions are configured to engage and conform to the cleaning flanges.

4. The wheel and lug nut cleaning device of claim 1 wherein the microfiber flanges are formed of chenille microfiber.

5. The wheel and lug nut cleaning device of claim 1 wherein the spine is formed of a material selected from the group consisting of a rust-resistant metal substance or a plastic-containing material.

6. The wheel and lug nut cleaning device of claim 1 wherein the core is petroleum impervious, non-water absorbent, and non-biodegradable.

7. A wheel and lug nut cleaning device comprising:
   a static central spine having an exterior end, an interior end, a receiver aperture disposed within the interior end, a front portion proximal the exterior end, and a rear portion continuously disposed between the front portion and the interior end, the rear portion being disposed in a single plane, the front portion being disposed at an angle relative the rear portion, wherein the angle of the front portion relative the rear portion is in a range of 10 degrees to 45 degrees;
   a shape-retaining non-abrasive core encircling the exterior end, the front portion and the rear portion of the spine;
   a sheath removably encompassing and substantially conforming to the core, the sheath having a gradually tapered wheel spoke and wheel rim-cleaning forward end diminishing in diameter toward a tip thereof, a rearward end, a central opening in the rearward end, and a plurality of spaced-apart semi-obround microfiber flanges continuously extending outwardly from the core away from spine from the tip to proximal the rearward end, each of the microfiber flanges having a rounded external end;
   a lug nut and rim cavity-cleaning body removably disposed on the interior end of the spine, the lug nut and rim cavity-cleaning body having a substantially disc-shaped central base having a proximal attachment end engageable to the receiver aperture disposed within the interior end and further having a plurality of spaced apart substantially parallelepiped flexible cleaning flanges radially disposed on the central base and a gap disposed between each of the cleaning flanges, each of the cleaning flanges having an internal side attached to the central base; and
   a cover removably disposed on the lug nut and rim cavity-cleaning body, wherein the cover includes a central ring and plurality of extensions radially disposed on the central ring, wherein the extensions are configured to engage and conform to the cleaning flanges.

8. The wheel and lug nut cleaning device of claim 7 wherein the microfiber flanges are formed of chenille microfiber.

9. The wheel and lug nut cleaning device of claim 8 wherein the spine is formed of a material selected from the group consisting of a rust-resistant metal substance or a plastic-containing material.

10. The wheel and lug nut cleaning device of claim 9 wherein the core is petroleum impervious, non-water absorbent, and non-biodegradable.

\* \* \* \* \*